June 17, 1941.  E. KÜBLER  2,246,308
CONVERTER SYSTEM
Filed Aug. 16, 1939
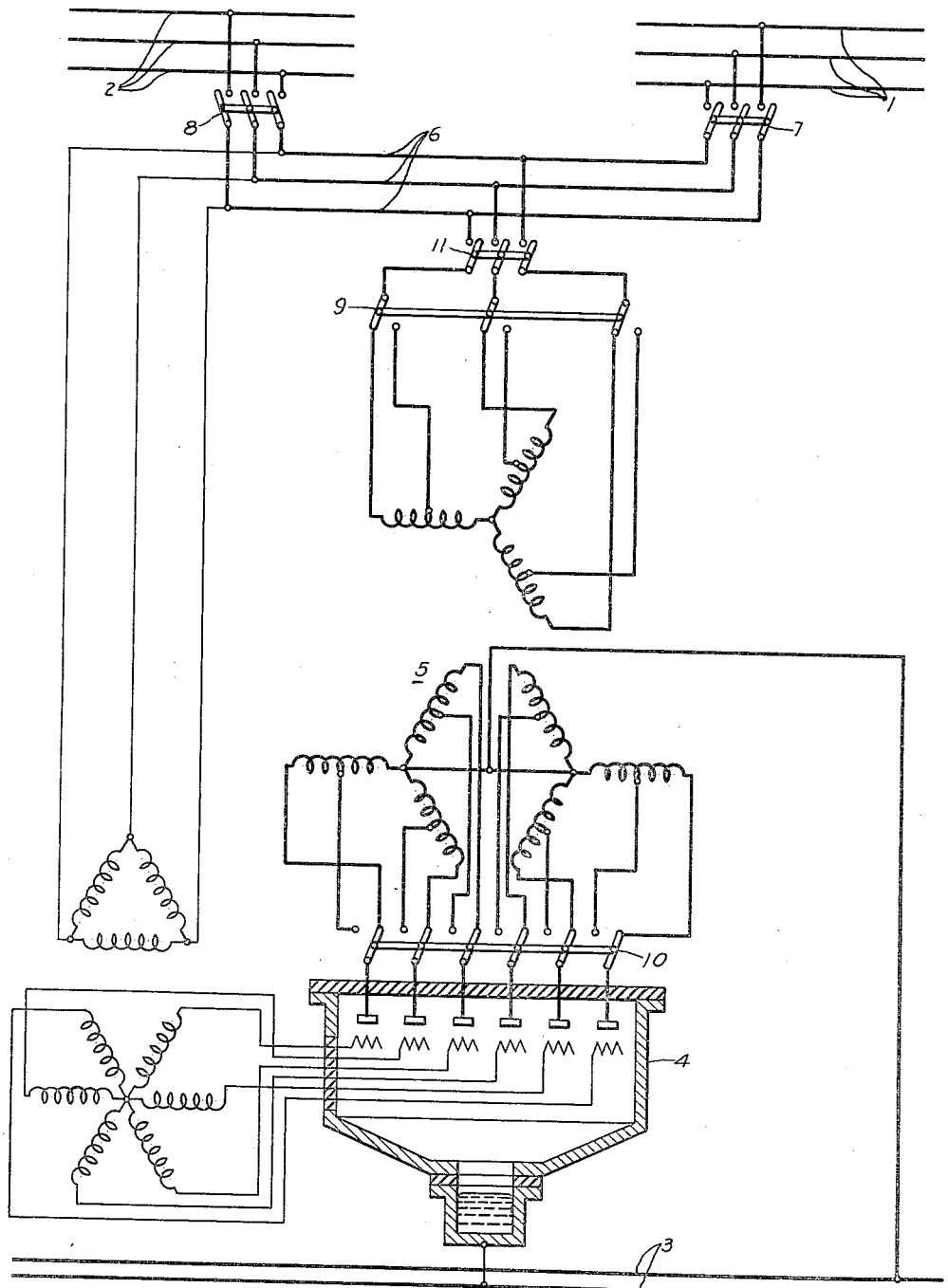
WITNESSES:
INVENTOR
Erwin Kübler
BY
ATTORNEY Patented June 17, 1941

2,246,308

UNITED STATES PATENT OFFICE 2,246,308

CONVERTER SYSTEM

Erwin Kübler, Berlin-Siemensstadt, Germany, assignor to Westinghouse Electric & Manufacturing Company, East Pittsburgh, Pa., a corporation of Pennsylvania Application August 16, 1939, Serial No. 290,507
In Germany August 16, 1938

2 Claims. (Cl. 175—363)

The invention relates to current supply to a direct current load from alternating current networks by means of rectifiers which convert the alternating current into direct current potential of desired magnitude, for example 800 volts. The basis of the invention is the problem of so constructing the converter plants with the associated rectifiers and transformers that are to be connected between the alternating current side and the direct current side of the energy supply plant that the different requirements arising for a change of the operating frequency on the alternating current side from a low frequency to a high frequency shall be fulfilled. Care should be taken that the converter plants are suitable for operation with both frequencies interchangeably, and that for both frequencies, an efficiency as high as possible and good utilization of the rectifiers and transformers used is attained.

The converter plant forming the subject matter of the invention is also suitable for current supply plants in which during operation permanently, one and the same train network is interchangeably supplied either from an alternating current network of high frequency or from an alternating current network of low frequency. Also here care must be taken that the converter plant, in spite of the difficulties introduced by the two frequencies, operates with maximum efficiency and good utilization of the apparatus.

In accordance with my invention, the problem of operating with different frequencies is solved by connecting the transformers of the rectifiers feeding the alternating current network with their full winding number on the primary and secondary side during operation with the smaller frequency, while during operation with the higher frequency, the connection on the primary and the secondary sides is changed by change-over switching devices to taps which are so selected that for both frequencies, the same characteristic for the dependence of the potential on the loading is attained on the direct current side. The invention thus arises from the fact that with each of the rectifiers associated with the converter plant which converts the alternating current available at any time into direct current, a transformer is associated which, in its power capacity, corresponds to the operation with the smaller frequency. For the rest naturally it is in its winding number dimensioned to correspond to the given potential. This same transformer is also used for the operation with the higher frequency. Only in the last case, the transformer is switched over by a change-over switching device on the primary side, as well as on the secondary side to taps, which decrease the winding number on both sides of the transformer. These taps are so selected that on the direct current side of a converter set, the potential supplied by the rectifier manifests the same characteristic in its dependence on the loading for both frequencies. This signifies, in other words, that both types of operation operate with the same so-called short circuit potential of the transformer. If it is assumed that operation with two frequencies such as 50 and 25 cycles is involved and that at both frequencies, the same alternating potential is available, then the above-named requirement of the same characteristic is attained if the transformer windings of the rectifier on the primary and secondary sides are tapped at a winding number of approximately $$\frac{1}{\sqrt{2}}$$

or approximately 70% of the total winding number. To this tap the transformer is switched over by the above-named change-over switch when the operation is to be changed from the smaller to the larger frequency.

The arrangement of the taps on the primary and secondary side of the rectifier transformers may also be so characterized that for the same primary potential of the two alternating current networks, the tapping is to be so selected that the ratio of the total winding numbers (operation with smaller frequency) to the winding number used for operation with higher frequency is related as the $$\sqrt{f_2}:\sqrt{f_1},$$

in which $f_2$ is the larger and $f_1$ the smaller frequency.

In the drawing, the circuit for the connection of a transformer associated with a converter plant is illustrated as an exemplary embodiment.

Let it be assumed that in a converter station, two alternating circuits 1 and 2 are provided, of which the circuit 1 is connected to an alternating current network at 50 cycles, the circuit 2 on the other hand to an alternating current network of 25 cycles. The circuit 3 of the direct current train network is connected through a mercury vapor rectifier 4 and a transformer 5 to an auxiliary bus bar 6. This auxiliary bar 6 may be tied through switches 7 and 8 either to the 50 cycle or to the 25 cycle alternating current network. For the invention, it is essential that the transformer 5 shall be provided on the primary side, as well as on the secondary side with taps satisfying the above-named requirements. By change-over switches 9 and 10, the full number of windings on the primary and secondary sides are connected in for operation at 25 cycles, for operation at 50 cycles, on the other hand, the smaller number of windings are connected in on the primary and secondary sides.

It should be, in addition, remembered that the switches 7 and 8 between the auxiliary collecting bar and the two networks 1 and 2, as well as the switch 11 connected in series with the transformer 5, are equipped with interlocking devices (not shown) which exclude connection of the rectifier with both networks. In addition, the two change-over switches 9 and 10 are so locked that they may be actuated only when the potential is zero. In addition, locking devices are preferably provided for the change-over switches 9 and 10 which provide that the network switch 7 of the high frequency alternating current network may be closed only if the switches 9 and 10 are connected to the taps of the transformer windings and that above all, the switch 8 of the low frequency network may only be closed if the switches 9 and 10 are connected to the full number of windings.

The converter plant illustrated in the drawing may also be used if the potentials of the two networks 1 and 2 are of different magnitudes. In this case, a correction, taking into consideration the potential difference, is to be considered in the selection of the tap positions, i. e., the transformation ratio of the transformer is to be correspondingly varied.

The structure of the rectifier transformers, according to the invention, offers substantial advantages. If transformers are associated with the rectifiers which, as to power and potential rating, are dimensioned for the smaller frequency, then the possibility arises of carrying out the operation at the higher frequency with the same transformer. This operation has, however, the great disadvantage that the characteristic line in dependence on the direct current potential, changes substantially as a function of the loading for the smaller frequency since the short circuit potential for the same loading rises to double the value; the slope of the characteristic lines is thus essentially different at the two frequencies. This property of a converter plant is in the operating art undesired because a parallel operation of a rectifier supplied with a smaller frequency with another rectifier connected to the larger frequency is not possible. It is proposed to meet this difficulty by connecting choke coils in series with the rectifier transformer when operating at the higher frequency to equalize the characteristic lines. Such choke coils are however, expensive, require comparatively large space in the converter plants and, in addition, continually add additional losses. The invention avoids all these disadvantages, separate choke coils are not necessary and in spite of this, operation with equal characteristic lines for both frequencies is attained.

A further advantage of the invention resides in the fact that the transformer losses for the operation with the higher frequency as compared to the losses for the operation with the lower frequency are substantially decreased. If, as mentioned above, the transformer is to be operated in one and the same circuit interchangeable with the smaller and larger frequency, the losses are substantially larger for operation at the higher frequencies than in a plant which operates with transformers dimensioned only for the higher frequency. For the example of operation of a transformer without the taps according to the invention at frequencies of 50 and 25 cycles, the losses would be for operation at 50 cycles approximately 1.7 times those in plants with transformers dimensioned for 50 cycles. If, on the other hand, the change-over circuit with taps according to the invention is used, the transformer losses in the transfer from the smaller to the larger frequency are substantially decreased. For the above example, the transformer losses for operation at 50 cycles are approximately 70% of the losses for operation with 25 cycles.

The invention is of particular significance for direct current train drives; it may, however, also be used for other current consumers in which the problem of deriving, by means of a converter plant necessary direct current interchangeably from alternating current networks of different frequencies is involved.

The invention is also applicable when two separate alternating current networks of different frequency are not involved, but for another reason arising from the operation, the alternating current feeding the transformer plant should operate interchangeably with different frequencies. The last named case may, for example, arise if the network of a rural supply of smaller frequency is to be changed over to a higher frequency.

I claim as my invention:

1. A converter system comprising a constant voltage direct-current circuit, a sixty-cycle alternating-current polyphase circuit, a twenty-five cycle alternating-current polyphase circuit, transformer means for interconnecting said circuits, a plurality of electric valves for controlling the flow of current between said circuits, said transformer having star connected primary and secondary windings, said windings having intermediate taps so connected that the ratio of turns between the star point and the tap to the total winding is of the order of $$\frac{1}{\sqrt{2}}$$

means for selectively connecting the terminal of one star connected winding to the valves and the terminal of the other winding to the twenty-five cycle winding for twenty-five cycle operation and for connecting the taps of windings to the valves and the sixty-cycle circuit for sixty-cycle operation, said system having substantially the same characteristic for each mode of operation.

2. A converter system comprising a direct-current load requiring substantially constant potential, two alternating-current supply circuits of different frequencies, a valve type converter, a feeding transformer connected to said converter, means for selectively energizing said transformer from either of said supply circuits, said transformer being wound so that at low frequency the terminals are connected to the line and to the converter, an intermediate tap in each winding to procure substantially similar characteristics when the intermediate taps are connected to the high frequency circuit and the converter.

ERWIN KÜBLER.